United States Patent [19]

Yamashita et al.

[11] Patent Number: 4,860,842

[45] Date of Patent: Aug. 29, 1989

[54] STEERING SYSTEM IN WHEELED VEHICLE

[75] Inventors: Masashi Yamashita; Koichi Sugihara; Hiroshi Kawakami, all of Toyota, Japan

[73] Assignee: Toyota Jidosha Kabushiki Kaisha, Aichi, Japan

[21] Appl. No.: 255,392

[22] Filed: Oct. 11, 1988

[30] Foreign Application Priority Data

Oct. 9, 1987 [JP] Japan ................................ 62-255721

[51] Int. Cl.$^4$ .............................................. B62D 5/20
[52] U.S. Cl. .................................... 180/140; 180/143; 280/91
[58] Field of Search ............... 180/140, 141, 143, 142; 280/91

[56] References Cited

U.S. PATENT DOCUMENTS

| 4,467,885 | 8/1984 | Furukawa et al. | 280/91 |
| 4,557,493 | 10/1985 | Sano et al. | 280/91 |
| 4,566,709 | 1/1986 | Sano | 280/91 |
| 4,572,316 | 2/1986 | Kanazawa et al. | 180/143 |
| 4,648,614 | 3/1987 | Hyodo | 280/91 |
| 4,781,261 | 11/1988 | Hyodo | 180/140 |

FOREIGN PATENT DOCUMENTS 60-85077  5/1985  Japan .
62-163870  7/1987  Japan .

*Primary Examiner*—John A. Pekar
*Attorney, Agent, or Firm*—Oliff & Berridge

[57] ABSTRACT

A four-wheel steering system in a wheeled vehicle includes a lateral control shaft operatively connected as its opposite ends with a set of rear steerable road wheels, and a rear-wheel steering mechanism operatively connected to a front-wheel steering linkage for effecting axial displacement of the control shaft in response to operation of the front-wheel steering linkage. In the rear-wheel steering mechanism, a hydraulic power cylinder is adapted to control axial displacement of the control shaft in such a manner that the control shaft is returned to and retained in a neutral position in the occurrence of unexpected trouble in a hydraulic control circuit of the power cylinder to retain the rear road wheels in their neutral positions.

4 Claims, 5 Drawing Sheets

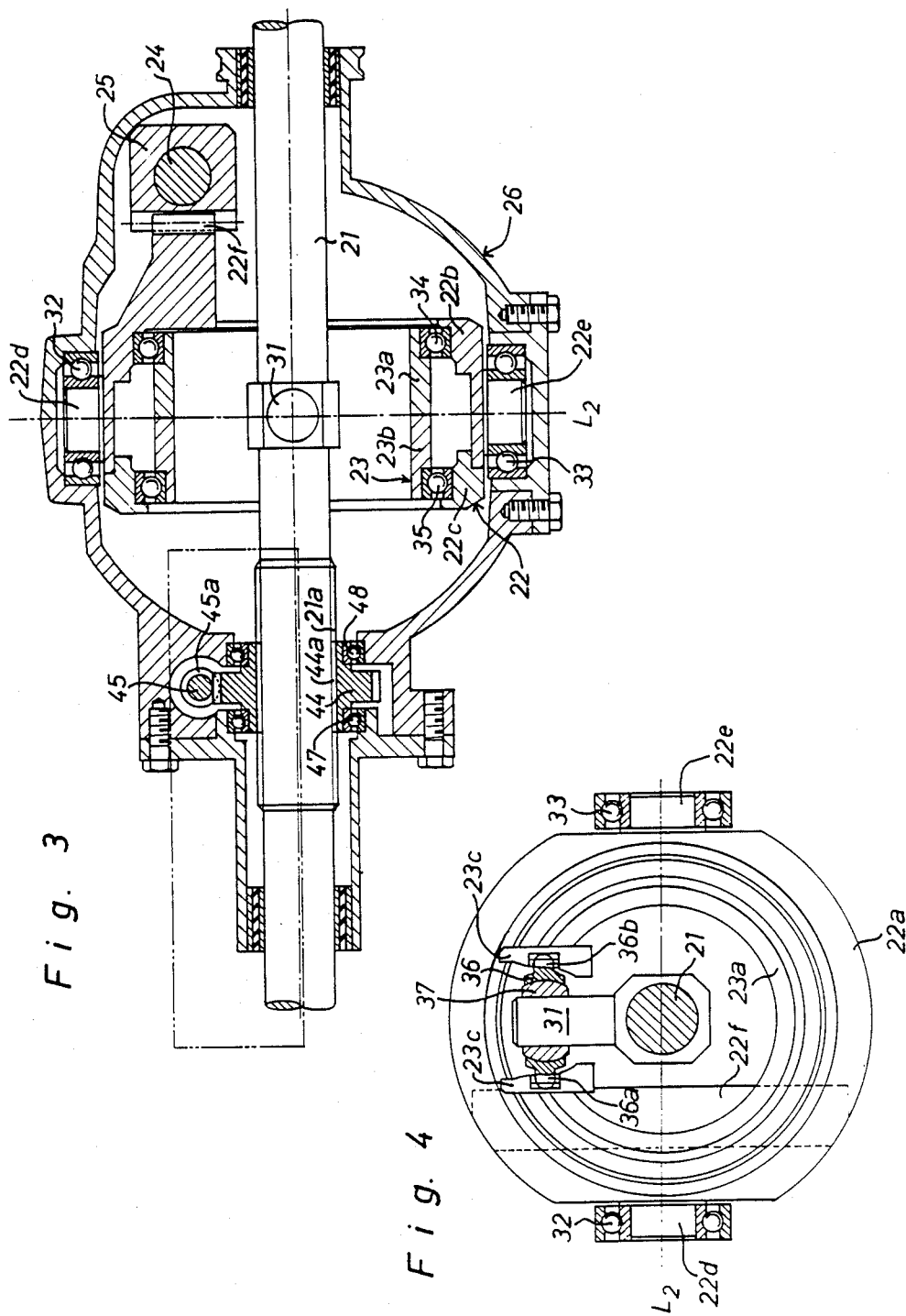

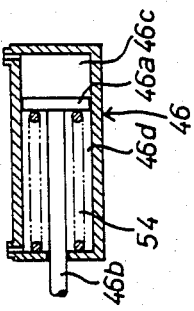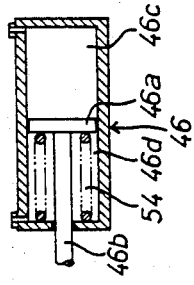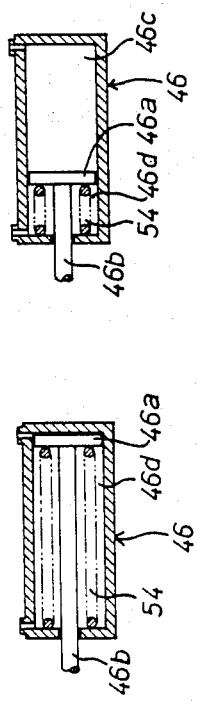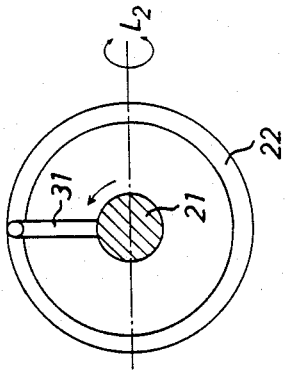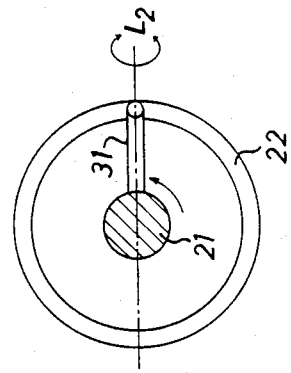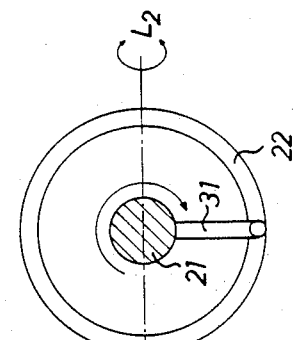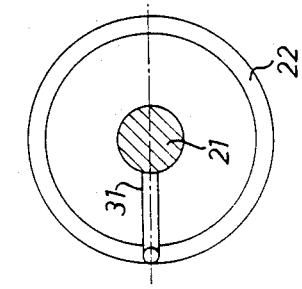

STEERING SYSTEM IN WHEELED VEHICLE

BACKGROUND OF THE INVENTION

1. Field of the Invention

The present invention relates to a steering system in a wheeled vehicle the front-wheel steering linkage of which is operatively interconnected to a rear-wheel steering linkage to steer the rear road wheels in response to steering operation of the front road wheels, and more particularly to a rear-wheel steering mechanism capable of controlling the steering angle ratio and direction of the rear road wheels relative to the front road wheels in accordance with travel conditions of the vehicle.

2. Discussion of the Background

Such a steering system as described above has been proposed in Japanese Patent Early Publication No. 62-163870, which steering system comprises a front-wheel steering linkage, a rear-wheel steering linkage including a lateral control shaft operatively connected at its opposite ends with a set of rear steerable road wheels, and a rear-wheel steering mechanism operatively connected to the front-wheel steering linkage for effecting axial displacement of the lateral control rod in response to operation of the front-wheel steering linkage. The rear-wheel steering mechanism includes a housing mounted on a vehicle body structure for axially slidably and rotatably supporting thereon the lateral control shaft, a first carrier body mounted within the housing for rotation about a vertical axis perpendicular to the central axis of the control shaft and arranged to be rotated in response to operation of the front-wheel steering linkage, a second carrier body mounted within the first carrier body for rotation about the central axis of the control shaft, a radial rod integral with the control shaft and being slidably and rotatably carried by the second carrier body, and an electric motor mounted on the housing for rotating the control shaft in accordance with travel speed of the vehicle.

In operation of the rear-wheel steering mechanism, the lateral control shaft is axially displaced by rotation of the first carrier body to steer the rear road wheels and is rotated by activation of the electric motor to control the steering angle ratio and direction of the rear road wheels relative to the front road wheels in accordance with travel speed of the vehicle. The steering system further comprises an electromagnetic clutch mechanism arranged to connect or disconnect the rear-wheel steering mechanism to and from the front-wheel steering linkage, and an electric control apparatus arranged to control the clutch mechanism and the electric motor in such a manner as to disengage the clutch mechanism and return the control shaft to a neutral position in the occurrence of unexpected trouble in the rear-wheel steering mechanism. Due to such arrangement of the clutch mechanism and the electric control apparatus, the rear-wheel steering mechanism becomes complicated in construction, and the steering system becomes costly. Moreover, the rear-wheel steering mechanism may not be controlled in the occurrence of some trouble in the clutch mechanism, the electric motor, the electric control apparatus and their associated parts.

In Japanese Patent Early Publication No. 60-85077, there is disclosed a steering system which comprises a rotary shaft extending longitudinally in a fore-and-aft direction of the vehicle to be rotated in response to steering operation of the front road wheels, a swingable rod connected at its front end with the rotary shaft by means of a universal joint, a crank mechanism actuated by a piston rod of a hydraulic power cylinder to move the rear end of the swingable rod upwards or downwards, and a joint member coupled with the swingable rod and connected at its opposite ends with a set of rear steerable road wheels through a pair of tie-rods. In operation of the steering system, the swingable rod is moved leftwards or rightwards in response to rotation of the rotary shaft to steer the rear road wheels through the joint member and tie-rods and is moved upwards or downwards by operation of the crank mechanism to control the steering direction of the rear road wheels relative to the front road wheels. The hydraulic power cylinder in the system is provided therein with a compression spring which is arranged to bias the piston rod toward a stroke end. In case the power cylinder may not be supplied with hydraulic fluid under pressure due to unexpected trouble in a hydraulic control apparatus, the piston rod is moved to and retained in the stroke end under the biasing force of the spring to retain the rear end of the swingable rod in the upward position so as to steer the rear road wheels in the same direction as the front road wheels. In such control of the rear road wheels, the turning ability of the vehicle is deteriorated during travel at a low speed.

SUMMARY OF THE INVENTION

It is, therefore, an object of the present invention to provide an improved rear-wheel steering mechanism wherein a hydraulic power cylinder is adapted to control rotation of the control shaft in the former steering system described above in such a manner that the control shaft is returned to and retained in the neutral position in the occurrence of unexpected trouble in a hydraulic control circuit of the power cylinder to retain the rear road wheels in their neutral positions.

According to the present invention, there is provided an improved rear-wheel steering mechanism which comprises a housing mounted on a body structure of the vehicle for axially slidably and rotatably supporting thereon a lateral control shaft operatively connected at its opposite ends with a set of rear steerable road wheels, a first carrier body mounted within the housing for rotation about a vertical axis perpendicular to the central axis of the control shaft and arranged to be rotated in response to operation of the front-wheel steering linkage of the vehicle, a second carrier body mounted within the first carrier body for rotation about the central axis of the control shaft, a radial rod integral with the control shaft and being slidably and rotatably carried by the second carrier body, and an actuator assembly mounted on the housing for rotating the control shaft. In the rear-wheel steering mechanism, the actuator assembly comprises a hydraulic power cylinder mounted on the housing and having a piston axially slidably disposed therein to subdivide the interior of the cylinder into a pair of fluid chambers one of which is supplied with hydraulic fluid under pressure and the other of which is connected to a fluid reserver and a piston rod connected at one end thereof with the piston for axial movement therewith, resilient means for biasing the piston toward a forward stroke end against the hydraulic pressure applied thereto, and a drive mechanism arranged between the power cylinder and the control shaft to rotate the control shaft in accordance with axial movement of the piston rod in such a manner that the radial rod of the control shaft is retained on the vertical axis when the piston has been positioned in the forward stroke end under the biasing force of the resilient means.

BRIEF DESCRIPTION OF THE DRAWINGS

Other objects, features and advantages of the present invention will become apparent to those skilled in the art as the disclosure is made in the following detailed description of a preferred embodiment of the invention as illustrated in the accompanying drawings, in which:

FIG. 3 illustrates a vertical section of the rear-wheel steering mechanism shown in FIG. 2;

FIG. 4 is a partially sectioned side view illustrating a relationship of a first carrier body, a second carrier body, a radial rod and a universal joint assembly shown in FIGS. 2 and 3;

FIGS. 6A to 6D illustrate the mode of operation of a piston in the power cylinder; and FIGS. 7A to 7D illustrate the angular positions of the radial rod caused by the mode of operation of the piston shown in FIGS. 6A to 6D.

DESCRIPTION OF THE PREFERRED EMBODIMENT

Figure 1:
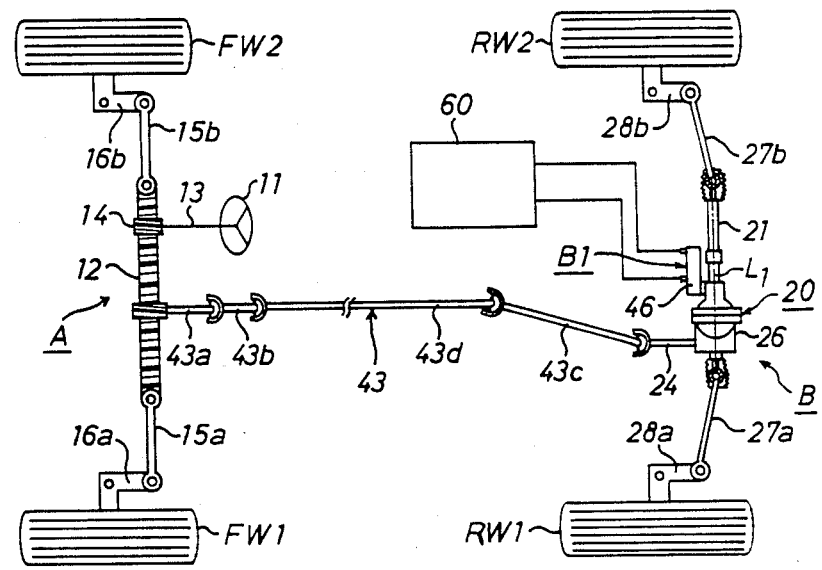
FIG. 1 is a schematic illustration of a four-wheel steering system in a wheeled vehicle.

Referring now to the drawings, FIG. 1 illustrates a four-wheel steering system in a wheeled vehicle the front-wheel steering linkage A of which is operatively interconnected to a rear-wheel steering linkage B. The front-wheel steering linkage A comprises a lateral rack-bar 12 operatively connected to a steering wheel 11 through a pinion 14 integral with a steering shaft 13 to be displaced by the driver's effort applied to the steering wheel, a pair of knuckle arms 16a, 16b connected to respective front steerable road wheels FW1, FW2 in a usual manner, and a pair of tie-rods 15a, 15b linked at their inner ends with the opposite ends of rack-bar 12 and their outer ends with the respective knuckle arms 16a, 16b. The rear-wheel steering linkage B comprises a lateral control shaft 21 arranged to be rotatable about its cenral axis $L_1$ and displaceable along its central axis $L_1$, a pair of knuckle arms 28a, 28b connected to a respective rear steerable road wheels RW1, RW2 in a usual manner, and a pair of tie-rods 27a, 27b linked at their inner ends with the opposite ends of control shaft 21 and at their outer ends with the respective knuckle arms 28a, 28b. The control shaft 21 is drivingly connected to the rack-bar 12 of front-wheel steering linkage A by means of a rear-wheel steering mechanism 20 and a rotary shaft assembly 43.

Figure 2:
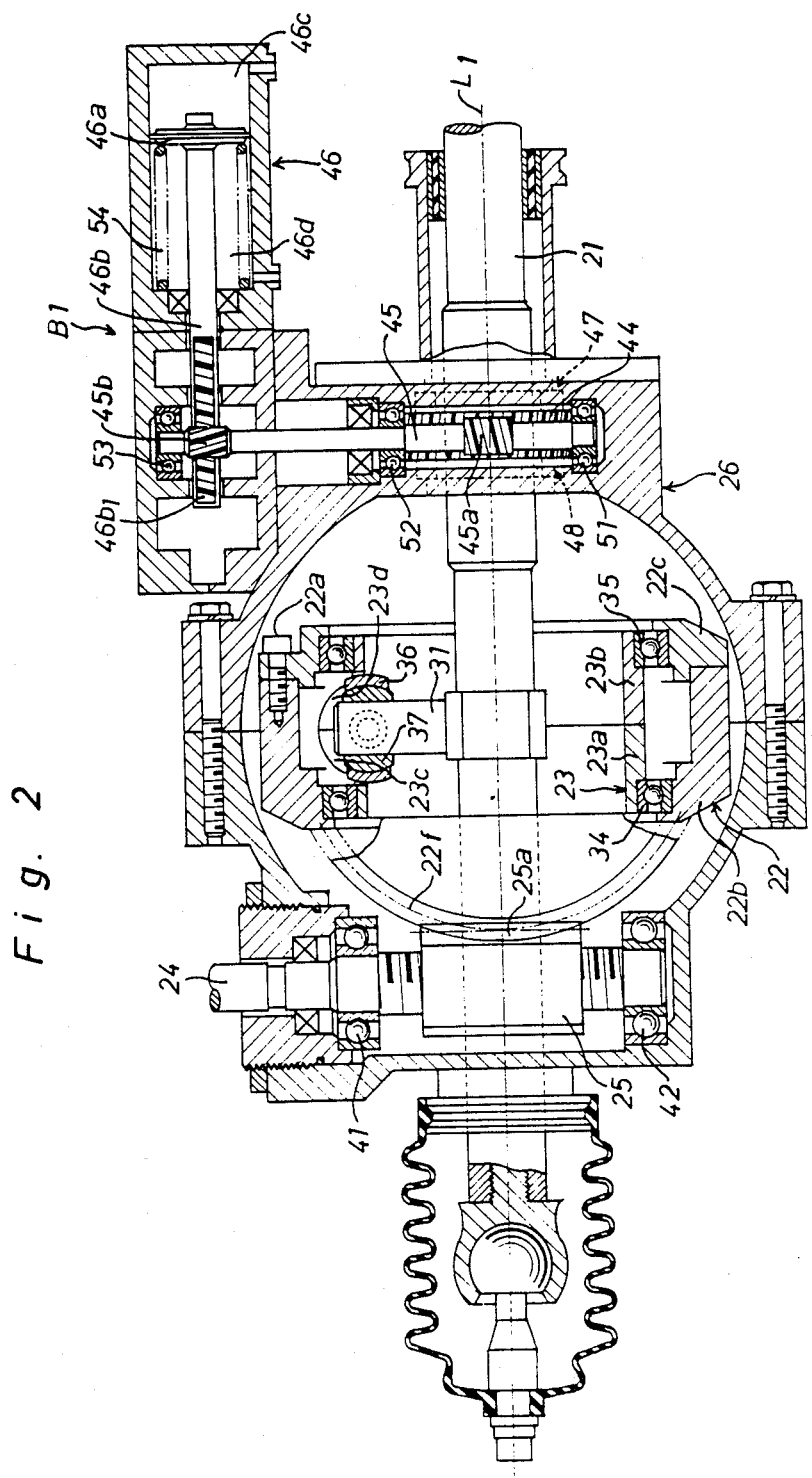
FIG. 2 is a sectioned plan view of a rear-wheel steering mechanism in accordance with the present invention.

The rotary shaft assembly 43 includes a main shaft 43d which is rotatably carried on a vehicle body structure (not shown) and extends longitudinally in a fore-and-aft direction of the vehicle. The main shaft 43d is drivingly connected at its front end to the rack-bar 12 by way of an intermediate shaft 43b and a pinion shaft 43a and at its rear end to an input shaft 24 of the rear-wheel steering mechanism 20 by way of an intermediate shaft 43c. As shown in FIGS. 2 to 4, the rear-wheel steering mechanism 20 includes a housing 26 mounted on the vehicle body structure for supporting thereon the control shaft 21, a first carrier body 22 rotatably mounted within the housing 26, a second carrier body 23 rotatably mounted within the first carrier body 22, and an actuator assembly $B_1$.

As shown in FIG. 2, the first carrier body 22 is composed of a cylindrical carrier member 22b and an annular carrier member 22c secured to the carrier member 22b by means of fastening bolts 22a. As shown in FIG. 3, the cylindrical carrier member 22b is integrally provided at its upper and lower ends with a pair of bearing portions 22d and 22e which are supported on the housing 26 through a pair of ball bearings 32 and 33 in such a manner that the first carrier body 22 is arranged to be rotatable about a vertical axis $L_2$ perpendicular to the central axis $L_1$ of lateral control shaft 21. The cylindrical carrier member 22b is further integrally provided at one side thereof with a toothed semi-circular portion 22f which is arranged to be rotatable about the vertical axis $L_2$. The toothed semi-circular portion 22f of carrier member 22b is permanently in meshing engagement with a ball nut 25 which is treadedly mounted on the input shaft 24. As shown in FIG. 2, the input shaft 24 is rotatably supported by a pair of axially spaced ball bearings 41 and 42 carried on the housing 26 and has a male screw portion on which the ball nut 25 is mounted through a plurality of balls (not shown) to be displaced forward or backward in response to rotation of the input shaft 24. The ball nut 25 has a rack portion 25a in meshing engagement with the toothed semi-cricular portion 22f of carrier member 22b.

The second carrier body 23 is composed of a pair of cylindrical carrier members 23a and 23b which are fitted to each other and supported within the first carrier body 22 by means of a pair of axially spaced ball bearings 34 and 35 for rotation about the central axis $L_1$ of lateral control shaft 21. As shown in FIGS. 2 and 4, the cylindrical carrier member 23a is integrally formed with a pair of opposed support arms 23c for supporting thereon a universal joint assembly, and the cylindrical carrier member 23b is also integrally formed with a pair of opposed support arms 23d which are coupled with the opposed support arms 23c to form a pair of opposed coaxial bores. The lateral control shaft 21 is integrally provided thereon with a radial rod 31 which extends perpendicularly to the central axis $L_1$ of lateral control shaft 21. The universal joint assembly includes an outer race 36 formed with an internal spherical surface and integrally provided with a pair of lateral projections 36a and 36b, and an inner race 37 rotatably coupled within the outer race 36. The lateral projections 36a ane 36b of outer race 36 are rotatably supported by a pair of axially spaced bearings mounted within the coupled support arms 23c and 23d of carrier members 23a and 23b. The radial rod 31 of control shaft 21 is slidably supported by the inner race 37 of the universal joint assembly to permit relative movement of the control shaft 21 with respect to the second carrier body 23.

As shown in FIGS. 2 and 3, the actuator assembly B1 includes a worm wheel 44 splined to the lateral control shaft 21 for rotation therewith, a worm shaft 45 provided thereon with a worm gear 45a in meshing engagement with the worm wheel 44, and a hydraulic power cylinder 46 mounted on the housiong 26 to rotate the worm shaft 45 in response to hydraulic fluid under pressure applied thereto. The worm wheel 44 has internally splined teeth 44a slidably engaged with externally splined teeth 21a of shaft 21 for permitting axial displacement of the control shaft 21. The worm wheel 44 is rotatably suppported within the housing 26 through a pair of axially spaced ball bearings 47 and 48 for rotation about the central axis $L_1$ of control shaft 21. The worm shaft 45 is arranged perpendicularly to the control shaft 21 and rotatably supported within the housing 26 through axially spaced ball bearings 51, 52 and 53.

Figure 5:
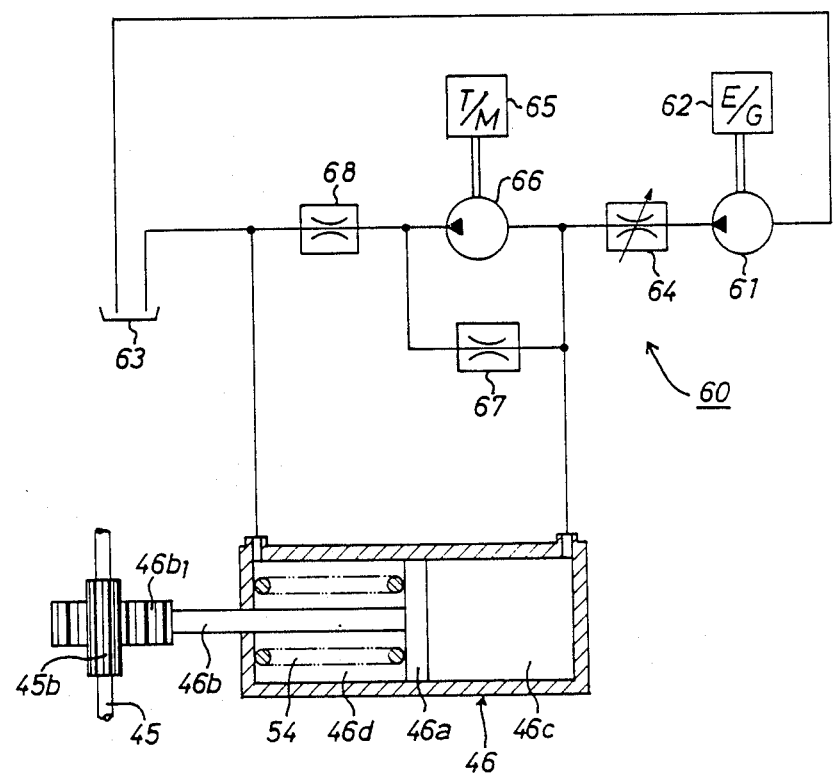
FIG. 5 is a schematic diagram of a hydraulic control circuit for a hydraulic power cylinder shown in FIG. 2.

As shown in FIG. 2, the hydraulic power cylinder 46 has a piston 46a axially slidably disposed therein to subdivide the interior of cylinder 46 into a pair of fluid chambers 46c and 46d, and a piston rod 46b connected at its one end with the piston 46a for axial movement therewith. The piston rod 46b has a rack portion $46b_1$ is meshing engagement with a pinion 45b integrally provided on worm shaft 45. Disposed within the fluid chamber 46d is a compression coil spring 54 which is arranged to bias the piston 46a and rod 46b righwards in the figure. As shown in FIG. 5, a hydraulic control circuit 60 for the power cylinder 46 includes a first hydraulic pump 61 connected at its inlet port to a fluid reservoir 63 and at its outlet port to the fluid chamber 46c of power cylinder 46 through a pressure compensated flow control valve 64, a second hydraulic pump 66 connected at its inlet port to an outlet of flow control valve 64 and at its outlet port to the fluid reservoir 63 through a fixed orifice 68, and a fixed orifice 67 disposed in a bypass conduit connected in parallel with the second hydraulic pump 66. In addition, the fluid chamber 46d of power cylinder 46 is connected to the fluid reservoir 63 at a downstream of the fixed orifice 68.

The first hydraulic pump 61 is driven by a prime mover 62 of the vehicle to supply hydraulic fluid under pressure into the fluid chamber 46c of power cylinder 46 and the second hydraulic pump 66 through the flow control valve 64, while the second hydraulic pump 66 is driven by a final drive gearing of a power transmission 65 of the vehicle to discharge hydraulic fluid under pressure therefrom in accordance with travel speed of the vehicle. During operation of the first hydraulic pump 61, the flow control valve 64 acts to constantly supply a predetermined amount of hydraulic fluid under pressure into the fluid chamber 46c of power cylinder 46, and the fixed orifice 67 acts to throttle the hydraulic fluid under pressure flowing therethrough in accordance with the discharge amount of hydraulic fluid from pump 66.

Hereinafter, the operation of the rear-wheel steering mechanism 20 will be described with reference to FIGS. 6A to 6D and 7A to 7D. Assuming that the first hydraulic pump 61 is inoperative during stopping of the prime mover 62, the piston 46a of power cylinder 46 is positioned in a rightward stroke end under the biasing force of coil spring 54. (see FIG. 6A) In such a condition, the radial rod 31 of control shaft 21 is retained on the vertical axis $L_2$ without any inclined angle. (see FIG. 7A) When the steering wheel 11 is operated to steer the front road wheels FW1, FW2 rightwards or leftwards, the rotary shaft assembly 43 is rotated by leftward or rightward displacement of the rack-bar 11 to rotate the input shaft 24 of steering mechanism 20 clockwisely or counterclockwisely. Then, the ball-nut 25 is moved forwards or backwards in response to rotation of the input shaft 24 to rotate the first carrier body 22 clockwisely or counterclockwise. In this instance, the second carrier body 23 rotates about the vertical axis $L_2$ to remain the radial rod 31 of control shaft 21 on the vertical axis $L_2$ and to retain the control shaft 21 in a neutral position. Thus, the rear road wheels RW1, RW2 are retained in their netural positions regardlessly of steering operation of the front road wheels FW1, FW2.

When the first hydraulic pump 61 is driven by start of the prime mover 62 to supply hydraulic fluid under pressure into the fluid chamber 46c of power cylinder 46 through the flow control valve 64, the piston 46a of power cylinder 46 is moved leftwards against the biasing force of coil spring 54 in accordance with the hydraulic pressure applied thereto. In this instance, the flow control valve 64 acts to constantly supply the predetermined amount of hydraulic fluid under pressure into the second hydraulic pump 66 and the fluid chamber 46c of power cylinder 46. When the power transmission 65 is operated to start the vehicle, the second hydraulic pump 66 is driven by the final drive gearing of power transmission 65 to discharge hydraulic fluid under pressure therefrom and to increase the discharge amount of hydraulic fluid in accordance with an increase of the vehicle speed. Thus, the hydraulic pressure applied to the fluid chamber 46c of power cylinder 46 is maximized under control of the fixed orifice 67 during stopping of the vehicle and is decreased under operation of the second hydraulic pump 66 in accordance with an increase of the vehicle speed. As a result, the piston 46a of power cylinder 46 is retained in a leftward stroke end against the biasing force of coil spring 54 during stopping of the vehicle and is moved righwards in accordance with an increase of the vehicle speed. (see FIGS. 6B to 6D)

Assuming that the prime mover 62 has been started during stopping of the vehicle to drive the first hydraulic pump 61, the piston 64a of power cylinder 64 is moved leftwards by the hydraulic fluid under pressure applied thereto from pump 61 to rotate the worm shaft 45 clockwisely. The clockwise rotation of worm shaft 45 is transmitted to the control shaft 21 through the worm wheel 44 to rotate the radial rod 31 of control shaft 21 with the second carrier body 23 clockwisely as shown in FIG. 7B. In a condition where the radial rod 31 of control shaft 21 is retained in a rearward position perpendicular to the vertical axis $L_2$, the second carrier body 23 is rotated about the vertical axis $L_2$ in accordance with clockwise or counterclockwise rotation of the first carrier body 22 to effect rightward or leftward displacement of the radial rod 31. In this instance, the outer race 36 of the universal joint assembly rotates about its lateral projections 36a, 36b, and the inner race 37 slides along the radial rod 31. As a result, the lateral control shaft 21 is displaced rightwards or leftwards to steer the rear road wheels RW1, RW2 leftwards or rightwards. Thus, the rear road wheels RW1, RW2 are steered in a reverse direction to the front road wheels FW1, FW2.

When the power transmission 65 is operated to start the vehicle at a low speed, the piston 46a of power cylinder 46 is moved rightwards in accordance with an increase of the vehicle speed as shown in FIG. 6C, and in turn, the control shaft 21 is rotated counterclockwisely in accordance with the rightward movement of piston 46a as shown in FIG. 7C. While the radial rod 31 of control shaft 21 is rearwardly inclined at an angle relative to the vertical axis $L_2$, the rear road wheels RW1, RW2 will be steered in the reverse direction to the front road wheels FW1, FW2 in the same manner as described above, and the steering angle ratio of the rear road wheels RW1, RW2 will be adjusted in accordance with the rearwardly inclined angle of the radial rod 31. When the radial rod 31 of control shaft 21 is retained on the vertical axis L2 during medium-speed travel of the vehicle, it will be remained on the vertical axis L2 even if the first carrier body 22 is rotated in response to steering operation of the front road wheels. In such a condition, the control shaft 21 is retained in the neutral position to retain the rear road wheels RW1, RW2 in their neutral positions regardlessly of steering operation of the front road wheels.

When the piston 46a of power cylinder 46 is further moved rightwards in accordance with a further increase of the vehicle speed as shown in FIG. 6D, the control shaft 21 is further rotated counterclockwisely as shown in FIG. 7D. While the radial rod 31 of control shaft 21 is forwardly inclined at an angle relative to vertical axis L2, it will be displaced leftwards or rightwards in accordance with clockwise or counterclockwise rotation of the first carrier body 22. As a result, the lateral control shaft 21 is displaced leftwards or rightwards to steer the rear road wheels RW1, RW2 rightwards or leftwards. Thus, the rear road wheels RW1, RW2 are steered in the same direction as the front road wheels FW1, FW2, and the steering angle ratio of the rear road wheels relative to the front road wheels will be adjusted in accordance with the forwardly inclined angle of the radial rod 31. When the radial rod 31 of control shaft 21 is retained on a forward position perpendicular to the vertical axis L2 during high speed travel of the vehicle, the steering angle ratio of the rear road wheels RW1, RW2 becomes a maximum value.

In case the fluid chamber 46c of power cylinder 46 may not be supplied with the hydraulic fluid under pressure due to unexpected trouble in the hydraulic control circuit 60, the piston 46a of power cylinder 46 is positioned in the rightward stroke end under the biasing force of coil spring 54 to retain the radial rod 31 of control shaft 21 on the vertical axis L2. In such a condition, the rear road wheels RW1, RW2 are retained in their neutral positions regardlessly of steering operation of the front road wheels FW1, FW2 to avoid deterioration of the turning ability of the vehicle during travel at a low speed.

Although a specific embodiment of the present invention has been shown and described, it is obvious that many modifications thereof are possible. For example, a well-known governor valve may be provided in the hydraulic control circuit 60 to control the supply amount of hydraulic fluid under pressure to the fluid chamber 46c of power cylinder 46 in accordance with the vehicle speed. The invention, therefore, is not intended to be restricted to the exact form depicted in the drawings and descriptions thereof, but is considered to include reasonable and obvious equivalents.

What is claimed is:

1. A steering system in a wheeled vehicle, comprising a front-wheel steering linkage arranged to be operated by a steering wheel, a rear-wheel steering linkage including a lateral control shaft operatively connected at the opposite ends thereof with a set of rear steerable road wheels, and a rear-wheel steering mechanism operatively connected to said front-wheel steering linkage for effecting axial displacement of said control shaft in response to operation of said front-wheel steering linkage, said rear-wheel steering mechanism comprising a housing mounted on a body structure of the vehicle for axially slidably and rotatably supporting thereon said control shaft, a first carrier body mounted within said housing for rotation about a vertical axis perpendicular to the central axis of said control shaft and arranged to be rotated in response to operation of said front-wheel steering linkage, a second carrier body mounted within said first carrier body for rotation about the central axis of said control shaft, a radial rod integral with said control shaft and being slidably and rotatably carried by said second carrier body, and an actuator assembly mounted on said housing for rotating said control shaft, wherein said actuator assembly comprises a hydraulic power cylinder mounted on said housing and having a piston axially slidably disposed therein to subdivide the interior of said cylinder into a pair of fluid chambers one of which is supplied with hydraulic fluid under pressure and the other of which is connected to a fluid reservoir and a piston rod connected at one end thereof with said piston for axial movement therewith, resilient means for biasing said piston toward a forward stroke end against the hydraulic pressure applied thereto, and a drive mechanism arranged between said power cylinder and said control shaft to rotate said control shaft in accordance with axial movement of said piston rod in such manner that said radial rod of said control shaft is retained on the vertical axis when said piston has been positioned in the forward stroke end under the biasing force of said resilient means.

2. A steering system as recited in claim 1, wherein said resilient means comprises a compression coil spring disposed within the other fluid chamber of said power cylinder to bias said piston toward the forward stroke end.

3. A steering system as recited in claim 1, wherein said power cylinder is arranged in parallel with said control shaft, and wherein said drive mechanism comprises a worm wheel rotatably mounted within said housing and splined to said control shaft for rotation therewith, a worm shaft arranged perpendicularly to said control shaft and rotatably supported within said housing, said worm shaft being provided thereon with a worm gear in meshing engagement with said worm wheel and a pinion in meshing engagement with a rack portion of said piston rod.

4. A steering system as recited in claim 1, wherein a hydraulic control circuit of said power cylinder is designed to maximize the supply amount of hydraulic fluid under pressure during stopping of the vehicle so as to move said piston from the forward stroke end to a backward stroke end against the biasing force of said resilient means and to decrease the supply amount of hydraulic fluid under pressure in accordance with an increase of the vehicle speed.

* * * * *